United States Patent [19]

Goodson et al.

[11] Patent Number: 5,080,534
[45] Date of Patent: Jan. 14, 1992

[54] LOW WATER MATERIALS TRANSPORTATION

[75] Inventors: Russell Goodson, Denver; Gary J. Colaizzi, Lakewood; Brian Masloff, Thornton, all of Colo.

[73] Assignee: Goodson & Associates, Denver, Colo.

[21] Appl. No.: 513,435

[22] Filed: Apr. 23, 1990

[51] Int. Cl.$^5$ .............................................. B65G 53/00
[52] U.S. Cl. ....................................... 406/46; 406/49; 406/191; 406/197
[58] Field of Search ........................... 406/46–49, 406/191, 193, 195, 197

[56] References Cited

U.S. PATENT DOCUMENTS

| | | | |
|---|---|---|---|
| 808,752 | 1/1906 | Isaacs et al. | 406/191 |
| 3,180,691 | 4/1965 | Wunsch et al. | 406/197 |
| 3,206,256 | 9/1965 | Scott | 406/197 |
| 3,302,977 | 2/1967 | Shock et al. | 406/49 |
| 3,313,577 | 4/1967 | Wolfe | 406/46 |
| 3,617,095 | 11/1971 | Lissant | 302/66 |
| 3,937,283 | 2/1976 | Blauer et al. | 406/46 |
| 3,950,034 | 4/1976 | Dreher et al. | 406/197 |
| 3,980,136 | 9/1976 | Plummer et al. | 406/197 |
| 4,200,413 | 4/1980 | Fitch | 406/49 |
| 4,451,183 | 5/1984 | Lorenz | 406/94 |
| 4,496,367 | 5/1991 | Mathiesen et al. | 406/47 |

FOREIGN PATENT DOCUMENTS

| | | | |
|---|---|---|---|
| 3427705 | 1/1986 | Fed. Rep. of Germany | 406/191 |
| 0611830 | 6/1978 | U.S.S.R. | 406/197 |

Primary Examiner—Joseph F. Peters, Jr.
Assistant Examiner—Linda L. Palomar
Attorney, Agent, or Firm—Kyle W. Rost

[57] ABSTRACT

A solid material, such as sand, mineral tailings, aggregate, or sludge is selected and treated to wet the surface of the material. A low moisture content foam is generated by passing a gas through a mixture of water and a surfactant, wherein the foam has a foam weight in the range from 15–50 gm/l. The solid material then is mixed with a quantity of the foam from 2–80% by resulting volume, sufficient to create of a foam-based slurry product having plug flow characteristics when pumped through a pipeline. The mixing can be accomplished by batch process or continuous flow processes. The slurry product is pumped through a pipeline and is regenerated as required within the pipeline by injecting additional foam into the slurry product while, substantially at the same time, mixing the slurry product with the additional foam by passing it over a mixing foil, which is especially effective in a bend of the pipe.

5 Claims, 1 Drawing Sheet

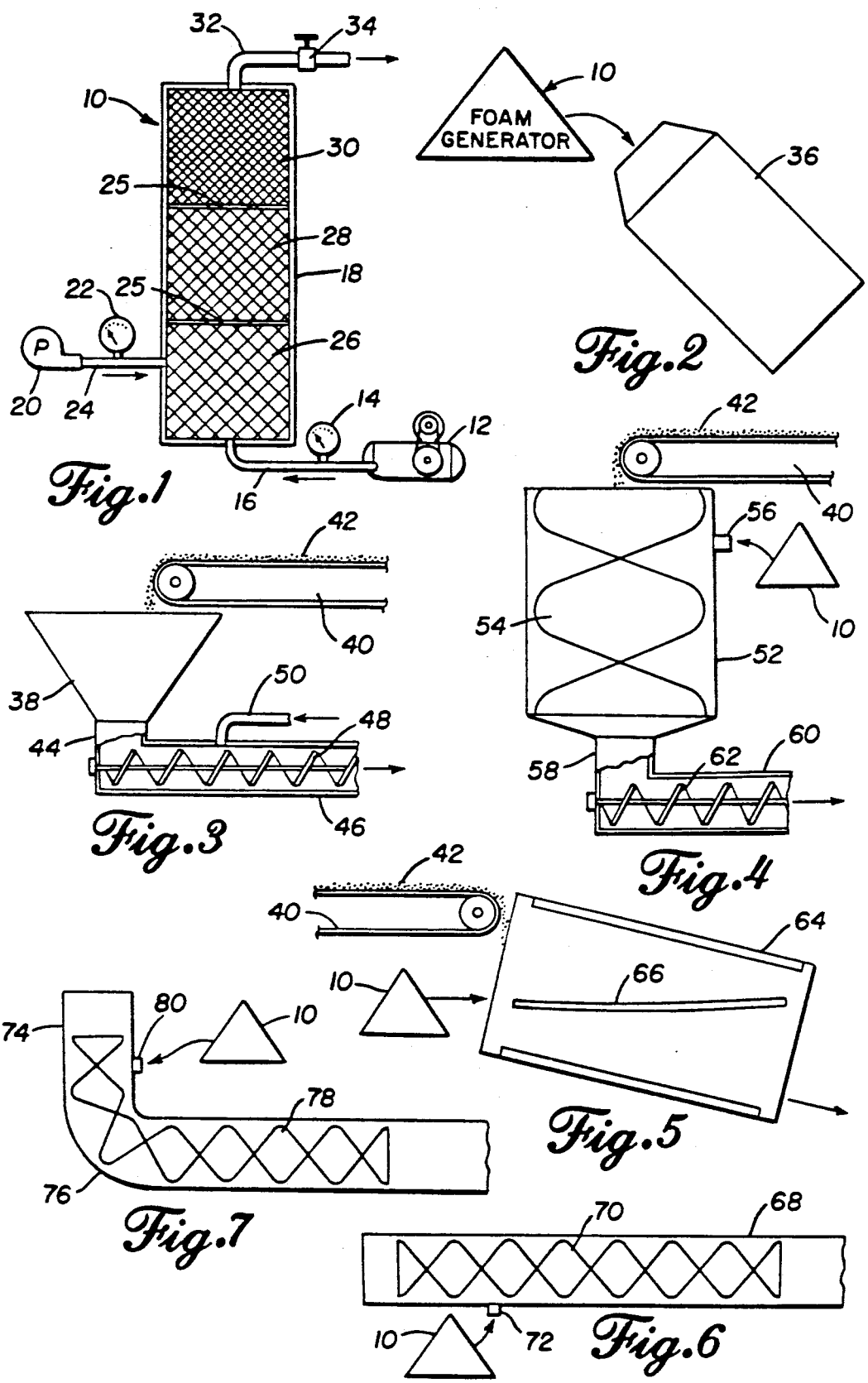

LOW WATER MATERIALS TRANSPORTATION

TECHNICAL FIELD

The invention generally relates to fluid current conveyors with an adjunctive substance added, especially to the addition of a liquid or solid. The invention also relates to a fluid current conveyor having means to introduce booster fluid into the conveyor. In still another aspect, the invention relates to processes in fluid current conveyors.

BACKGROUND ART

A number of solid granular materials commonly are pumped in slurry form. For example, sand, mill tailings, coal, and aggregates can be transported through a pipeline in a sufficiently large volume of water. For example, when it is desired to transport mill tailings, such tailings are dumped into a cone-bottom tank. There they are mixed with a liberal quantity of water and pumped through a pipeline to a settling pond. However, upon arrival at the pond, the tailings quickly settle out of the water and form mounds that must be leveled by additional efforts.

If such tailings or other solids are being used to backfill mine areas or underground voids, their tendency to settle out of the carrier water presents a problem. The uneven settling of the solids leaves unfilled areas, and it is difficult or impossible to redistribute them uniformly.

The transportation of solids in pipelines has been attempted by a number of processes. The basic concept has been to suspend the solids in a sufficient quantity of liquid to sweep the solid with the flow of the liquid. However, this technique is unsatisfactory when the liquid is scarce or valuable, difficult to recover, or difficult to dispose of. Similarly, the use of substantial quantities of liquid in a pipeline is unsatisfactory when it becomes costly or difficult to recover the solid in the desired, useable condition. Another problem is that solids may tend to settle out of the carrier liquid if velocity is sufficiently low. A number of transportation techniques have been proposed to overcome these problems.

Scott U.S. Pat. No. 3,206,256 proposes to overcome the tendency of particles to settle out in the pipeline by agglomerating the particles with an immiscible film, bringing the density of the agglomerate closer to the density of the carrier liquid. This technique continues to employ a substantial quantity of carrier liquid, which is preferred to be a petroleum product. Thus, the patent anticipates the availability of substantial quantities of such liquid, from which the solid must be separated and recovered at the point of destination.

Lissant U.S. Pat. No. 3,617,095 proposes to transport coal and other minerals in pseudo-plastic fluids such as polymer solvents, gels and emulsions. These carrier liquids are said to behave in non-Newtonian fashion, in that effective viscosity varies with rate of shear. This category of carrier liquid does not include water, which behaves in Newtonian fashion in that effective viscosity does not vary with rate of shear. A substantial quantity of carrier liquid continues to be required and must be separated at the point of destination.

U.S. Pat. No. 3,950,034 to Dreher et al. discloses a specially formulated liquid composition for carrying suspended solids. The liquid is a combination of water, hydrocarbon, and surfactant. The carrier liquid exhibits retro-viscous behavior in that it exhibits a large increase in flow rate in response to a small increase in pressure. A substantial quantity of the carrier liquid is required, with preferred solids content being 30% to 50% by weight. Thus, a separation and recovery procedure is necessary at point of destination.

Lorenz U.S. Pat. No. 4,451,183 discloses a method of transporting aggregate by the separate introduction of a foam into a pipeline with the aggregate slurry and moving the foam under pressure. The foam is of types known in the oil industry and is injected at low points in the pipeline, where fines normally tend to settle out from the foam based slurry. Lorenz further proposes to substitute foam for liquid, injecting the foam at the beginning the the pipeline. In this case the foam is regenerated by agitation from an injected gas at various points along the pipeline, and additional foam is injected at low points of vertical runs in the pipeline to prevent the aggregate from falling back. Thus, this process relies upon the high viscosity of the foam to carry the aggregate and upon maintenance of sufficient velocity in the pipeline to keep the aggregate carried by the foam, remixing by adding supplemental gas or foam at the locations where settling-out is most likely.

Various patents have taught the use of foams for fracturing well formations. These foams have included sand or other granular solids as proppants. U.S. Pat. No. 3,980,136 to Plummer et al. discloses such a foam fracturing technique, in which sand, water, and surfactant are mixed and then converted into a foam by injection of a suitable gas. U.S. Pat. No. 3,937,283 to Blauer et al. is of similar content. Thus, the production of foams is well known It would be desirable to have the ability to move low water content granular solids or aggregates for long distances through pipelines without the requirement of maintaining a high velocity for preventing settling out of the solids.

Similarly, it would be desirable to use existing pipelines for flowing such solids, without requiring special vertical stations for the regeneration of the foam and to pick-up settled out solids.

Also, it would be desirable to produce mixtures of solids and foam that can be moved through pipelines with low friction or resistance.

It also would be desirable to create a self-leveling pumpable material, such that mines could be back-filled and voids filled without leaving empty areas.

To achieve the foregoing and other objects and in accordance with the purpose of the present invention, as embodied and broadly described herein, the foam product and method of transportation of this invention may comprise the following.

DISCLOSURE OF INVENTION

Against the described background, it is therefore a general object of the invention to provide an improved foam-based slurry product that carries solid particles in "plug flow" through a pipeline.

Another object is to provide a method of transporting a foam-based slurry in plug flow, with an ability to regenerate the slurry within the normal confines of a pipeline.

More specifically, it is an object of the invention to provide a method of regenerating a foam-based slurry having plug flow, wherein the regeneration takes advantage of characteristics of existing bends and curves in the pipeline to enhance the mixing of the slurry with freshly added foam.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a method of forming a pumpable slurry material and transporting it through a pipeline requires the initial selection of a solid material. A foam is generated by passing a gas through a mixture of water and a surfactant, wherein the foam has a foam weight in the range from 15-50 gm/l. The solid material is mixed with a quantity of the foam constituting 2-80% by resulting volume, sufficient to create a slurry product having plug flow when pumped through a pipeline. The slurry product is pumped through a pipeline, wherein the product is regenerated within the pipeline by injecting of additional foam into the slurry product and, substantially at the same time, mixing the slurry product and additional foam by passing it over a mixing foil.

The accompanying drawings, which are incorporated in and form a part of the specification illustrate preferred embodiments of the present invention, and together with the description, serve to explain the principles of the invention. In the drawings:

BRIEF DESCRIPTION OF DRAWINGS

FIG. 1 is a schematic view of a foam generator.

FIG. 2 is a schematic view of the batch method of producing the low water content material.

FIG. 3 is a schematic view of a first continuous feed method of producing the low water content material.

FIG. 4 is a schematic view of a second continuous feed method of producing the low water content material.

FIG. 5 is a schematic view of a third continuous feed method of producing the low water content material.

FIG. 6 is a schematic view of a first in-line apparatus for regenerating the low water content material.

FIG. 7 is a schematic view of a second in-line apparatus for regenerating the low water content material.

BEST MODE FOR CARRYING OUT THE INVENTION

A pumpable material and method of transportation allow sand, mill tailings, flotation tailings, screen tailing, indigeneous soils, coal, metallic ores, aggregates, sewage and the like solid organic or inorganic meterials transported through pipelines in a state having extremely low associated water content, such as no more than 40% by weight. The transported material is self-leveling at the point of destination, and has little moisture content. Consequently, the material and the method of its preparation and transportation are useful in the disposal of mine waste and tailings, for mine backfilling and sand filling, for mine slope filling, and for sewage disposal. For example, mine waste or tailings can be transported to ponds or fill areas with less than twenty percent moisture and in some cases as low as five percent, while retaining pumpability. The need for a settling pond or water handling devices is eliminated. Similarly, the low moisture content of the pumpable material eliminates water handling when used in mine backfilling and slope filling, to fill underground voids and slopes. Industrial plants can minimize water usage when disposing of solid wastes that can be transported by pipeline.

The pumpable material is obtained by, first, selecting a solid material to be transported. Then the moisture content of the solid is adjusted, if necessary, to hydrate the surface of the solid particles. Thereafter, the solid is mixed with a foam until the solid and foam mixture is of proper consistency for plug flow through a pipeline. The material then is suited to be pumped to its destination via pipeline.

The choice of solid material presents a wide range of possibilities. Of the examples given above, sand, mill tailings, aggregates and the like may be considered to be relatively dry. On the other hand, sewage sludge typically has a considerable moisture content. Many other types of solid material could be chosen, as well.

Regardless of what material is chosen, its water content may require adjustment. The dry solids should be wetted sufficiently to coat the individual grains or particles, so that they do not hydrate from the foam. A more damp material such as sewage sludge may not require wetting. The sufficiency of moisture content can be evaluated by applying a sample of the foam and observing whether the foam survives well. It has been observed that a moisture content of from three percent to twenty percent by weight is suitable. The proper moisture content depends upon the surface area of the solid material. Solids with high surface area per unit of volume require more water. Thus, for example, clay requires a relatively high percentage of water, while coarse sand requires only a relatively low percentage of water. An overly dry solid will absorb moisture from the foam and cause it to collapse rapidly. This empirical evaluation can be made quite rapidly on a representative sample of the selected solid. The preferred method of wetting the solid is by adding water from any available source and mixing well. Foam, itself, could be added as the source of water, but this method may be quite inefficient due to the low water content of the foam. The following example is representative.

EXAMPLE 1

Galena ore is selected and placed in a rotating drum mixer. A sample of the dry ore has a density of 190 lb/ft$^3$. Water is mixed with the ore to 12% of the ore weight. Then, density is measured and found to be 238 lb/ft$^3$.

When the solid is wetted to the point that the sample of foam is observed to survive when in contact with it, then a quantity of foam is added and mixed with the solid to achieve proper consistency for plug flow in a pipeline. "Plug flow" refers to the state wherein the slurry moves through the pipeline as a moving unit or series of moving units in which there is no substantial internal mixing within each unit. Thus, for example, the surface friction between the pipeline wall and the slurry does not generate substantial internal mixing currents in the slurry. The proper quantity of foam to add is an empirical determination that is best learned by experience with each selected solid. It has been found that the proper amount of foam is in the broad range from 2% to 80% by volume. For example, when foam is to be added to a concrete sand having an initial density of 89 lb/ft$^3$, the endinq density may be in the approximate range from 84 to 20 lb/ft$^3$. When too little foam has been added, the mixture is too thick to pump. When too much foam has been added, the mixture becomes extremely light and appears soupy. When the mixture is of proper consistency, it may be discharged from the mixing apparatus for transportation by pumping, pipeline flow, or gravity flow. The resulting low water content slurry material generally will have no more than 40% water. The following example is representive.

EXAMPLE 2

A coarse sand is selected and placed in a rotating mixing drum. Water is added to about three percent by weight of the sand. Then, the density of the wetted sand is measured to be of 83 lb/ft$^3$. Next, foam having 0.1% water by volume is added in quantity sufficient to reduce the density of the sand to 77 lb/ft$^3$, and the foam is thoroughly mixed with the sand. At the resulting density the sand is capable of plug flow. Additional foam is added and mixed with the sand, reducing the density of the sand to 57 lb/ft$^3$. The mixture remains suitable for plug flow.

The foam is formed of water and a commercially available surfactant, chosen to produce a suitable foam viscosity to enable the foam to suspend the selected solid material in a uniform mixture suited for plug flow. Surfactant concentration is in the range from 1.5–30 grams/liter and is preferred to be in the range from 3–25 grams per liter of water. Also, a commercial stabilizing additive may be added. Stabilizer concentration is 1 to 10% by weight. The foam is formed of small vesicles of air with a thin liquid membrane coating each bubble. The bubbles serve as a transport mechanism. After the slurry material is placed at its point of destination, the bubbles in time will dissipate, allowing the slurry material to compact. The surfactant is biodegradable, leaving behind only the selected solid and any residual moisture.

As can be seen from the above Example 2, the addition of the foam is a means for reducing the total weight of the slurry material per unit of volume. Thus, a pump will have less head pressure to pump against. Furthermore, the bubbles in the foam act as a means for keeping the slurry material homogeneous over extended distances. The bubbles also act as a means for keeping the slurry material viscous, with the result that the slurry may contain coarse aggregate and still remain homogeneous while being transported over extended distances. The bubbles incorporated into the slurry also act as a means for lubricating and reducing friction, further assisting the slurry to flow long distances. At the point of destination, the foam allows the slurry to settle in a self-leveling manner.

With reference to the drawings, the solid material is processed into the pumpable low water slurry by use of a foam generator and a mixing apparatus. The foam generator 10, shown in FIG. 1, is a high shear unit. It includes an air compressor 12 capable of 10–50 cfm and operates at pressures of 5–100 psi. A flow meter 14 controls air in the range of 10–50 cfm. The compressor and flow meter supply air through a conduit 16 to a shear chamber 18 that is capable of developing foam in the range of 20–35 grams/liter, utilizing packings of steel mesh fabric. The water and surfactant mixture are supplied to the shear chamber by progressing cavity pump 20 that is capable of 1–8 gpm at pressures of 5–100 psi. A flow meter 22 controls the water output from the pump in the range of 1–10 gpm. A conduit 24 connects the pump to the shear chamber.

The shear chamber is formed of multiple compartments progressively connected by passages 25. Both the air and water are introduced into a first, or lower compartment 26, containing a packing of relatively low density. The second or central chamber 28 is more densely packed, and the third or top chamber 30 is most densely packed. An outlet conduit 32 receives the foam generated by the chamber and is controlled by a valve 34. The foam generator typically foams two cubic yards of solid from approximately eight gallons of water and surfactant mixture. The preferred foam weight is approximately 28–30 grams/liter, although suitable foams may have a weight in the range from 15–50 grams/liter.

With reference to FIG. 2, the low water content slurry material can be produced by batch mixing. A rotating drum 36, such as a mixer or concrete truck drum, receives the selected solid. The necessary wetting water, if any, is added from any available source and mixed with the solid. Then the foam generator 10 is operated to inject the optimum amount of foam, while the drum continues to turn. When the slurry is complete, the product is discharged into a hopper and then pumped or gravity fed.

Several methods and apparatus are suited for constant production of the slurry material. FIG. 3 shows a hopper 38 having a continuously operating conveyor 40 discharging the selected solid 42 into the hopper. The solid may have had its water content adjusted, if at all, prior to being fed to the hopper, as on the conveyor belt. At the throat 44 of the hopper, the solid feeds by gravity into a housing 46 containing a screw auger 48. The auger causes the solid material to be folded and mixed. The foam is injected into housing 46 at a suitable inlet 50 from the foam generator. The foam is fed at a continuous rate and is mixed with the solid by the auger. The slurry may be discharged from the auger directly into a pump or pipeline, or for gravity feed.

A second continuous production apparatus and method is shown in FIG. 4 and may employ gravity mixing. The conveyor 40 feeds the solid 42 into the top of a cylindrical chamber 52. A helical foil 54 extends axially within the chamber and causes the solid to fold upon itself as it falls under gravity. A foam inlet 56 supplies foam from the generator 10 to a point near the top of the chamber 52, and this foam is mixed with the solid as it is folded. At the lower end of the chamber 52, the slurry is discharged through a throat 58 into a conduit 60. A pump auger 62 may direct the slurry through conduit 60.

A third continuous production apparatus and method is shown in FIG. 5. Conveyor 40 may feed the solid 42 into a trommel 64 or like rotating sleeve mixer having mixing paddles 66 on its inner surface. The foam generator 10 injects foam into an open end of the mixer, and the slurry product exists the opposite end in a continuous fashion.

The slurry product is pumpable and moves through a pipeline with plug flow. Thus, the product does not substantially mix with itself in the pipeline. It is possible for some bubbles in the foam to be lost after the slurry has been pumped over an extended distance, due to friction and the effect of the pipeline wall upon the individual bubbles. In order to overcome this problem without altering the path of the pipeline, a twisted or helical foil is inserted into the pipe at any point where regeneration of the slurry is desired. In FIG. 6, such a segment of a pipeline 68 is shown to contain a helical foil 70, which may be from three to eight feet long. As the slurry passes the foil in plug flow, the foil causes the slurry to fold onto itself. Foam generator 10 injects fresh foam into the slurry at a suitable inlet 72 near the upstream end of the foil, so as to be folded into the slurry. Such regeneration is possible at any point in the pipeline.

In a special situation as shown in FIG. 7, the slurry is regenerated within a pipeline 74 by taking advantage of the velocity changes that take place at any existing bend or curve 76 in the pipeline. At a curve, plug flow is disrupted by the changing velocities at the different radii of the curve. Thus, a curve or bend is an especially useful location for placement of a helical foil 78. The foam generator 10 can inject fresh foam near the upstream end of the foil, through an inlet 80. The folding action induced by the foil is especially effective to regenerate the slurry at a curve due to the extra mixing action associated with the bend.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

We claim:

1. A method of forming a pumpable foam and solids material for plug flow transport through a pipeline, comprising:
   selecting a solid material;
   independently of said solid material, generating a foam of water, air, and a surfactant, said foam having a foam weight in the range from 15-50 gm/l; and
   subsequently mixing said solid material with a quantity of said foam constituting from 2-80% by volume of the total mixture, sufficient to create a uniform product of mixed foam and solids having plug flow characteristics when, in use, pumped through a pipeline.

2. The method of claim 1, further comprising:
   subsequent to said mixing step, pumping said foam and solids product through a pipeline; and
   regenerating the foam and solids product within the pipeline by injecting additional foam into the foam and solids product and, substantially at the same time, mixing the foam and solids product and additional foam by passing it over a static mixing foil.

3. The method of claim 2, wherein said pipeline has at least one bend in its pathway, further comprising:
   locating said mixing foil in a bend of the pipeline pathway, whereby the flow velocity difference at different radii of the bend contributes to mixing the slurring product with said additional foam.

4. The method of claim 1, further comprising:
   prior to mixing said solid material and foam, adjusting the moisture content of the solid material with water such that its surface is wetted.

5. The method of claim 4, wherein said surfactant and water are mixed in a concentration of from 1.5-30 grams surfactant per liter of water.

* * * * *